US006498682B2

(12) United States Patent
Glance

(10) Patent No.: US 6,498,682 B2
(45) Date of Patent: *Dec. 24, 2002

(54) TUNABLE ADD/DROP FILTER

(75) Inventor: Bernard Glance, Colts Neck, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,429

(22) Filed: Jun. 28, 1999

(65) Prior Publication Data

US 2001/0002940 A1 Jun. 7, 2001

Related U.S. Application Data

(60) Provisional application No. 60/113,922, filed on Dec. 28, 1998.

(51) Int. Cl.[7] ............... G02B 27/00; G02B 5/22; G02B 6/26; G02B 6/32
(52) U.S. Cl. ............... 359/578; 359/889; 359/885; 385/31; 385/33
(58) Field of Search ............... 385/24, 31, 33, 385/34, 37, 18; 359/889, 359, 885, 892, 260, 129, 127, 578; 356/301

(56) References Cited

U.S. PATENT DOCUMENTS

| 4,738,535 | A | * | 4/1988 | Webster | 356/418 |
|---|---|---|---|---|---|
| 5,212,584 | A | * | 5/1993 | Chung | 359/260 |
| 5,283,845 | A | * | 2/1994 | Ip | 385/24 |
| 5,339,157 | A | | 8/1994 | Glance et al. | 385/24 |
| 5,442,438 | A | * | 8/1995 | Batchelder et al. | 356/301 |
| 5,461,685 | A | | 10/1995 | Glance et al. | 385/24 |
| 5,488,500 | A | | 1/1996 | Glance | 359/127 |
| 5,493,625 | A | | 2/1996 | Glance | 385/24 |
| 5,526,153 | A | | 6/1996 | Glance | 359/123 |
| 5,542,010 | A | | 7/1996 | Glance | 385/14 |
| 5,566,014 | A | | 10/1996 | Glance | 359/124 |
| 5,689,333 | A | * | 11/1997 | Batchelder et al. | 356/301 |
| 5,748,812 | A | * | 5/1998 | Buchin | 385/18 |
| 5,754,321 | A | | 5/1998 | Giles et al. | 359/124 |
| 5,812,291 | A | * | 9/1998 | Bendelli et al. | 359/129 |

OTHER PUBLICATIONS

Bio–Logic—Science Instruments, SA, *Bio–Logic Optical Filter Wheel—LAMBDA* 10–2, <http://www.bio–logic.fr/lambda2.html>, printed 12/122/98, pp. 1–3.

* cited by examiner

Primary Examiner—Audrey Chang
(74) Attorney, Agent, or Firm—Kenyon & Kenyon

(57) ABSTRACT

An inexpensive and efficient tunable electromagnetic filter is disclosed, having a wide range of tunable frequencies, comprising a holder with a number of filters mounted on the holder. The frequency of the filter is altered by moving the holder relative to a beam striking the holder so that one of the filters is filtering the beam. The frequency to be filtered may be easily and quickly changed, without altering the structure of the filter. In one embodiment the tunable filter is a disk rotatable by a motor with a number of fixed frequency filters mounted around the periphery of the disk. The filter is surrounded by four fibers providing and receiving beams, as with known add-drop filters.

1 Claim, 4 Drawing Sheets

TUNABLE ADD/DROP FILTER

PRIOR PROVISIONAL PATENT APPLICATION

The present application claims the benefit of U.S. Provisional Application No. 60/113,922, entitled "Tunable Add/Drop Filter," filed Dec. 28, 1998.

BACKGROUND OF THE INVENTION

This invention relates to an electromagnetic filter whose frequency may be quickly and easily altered.

Electromagnetic filters may filter a stream of electromagnetic energy by separating certain frequencies from the stream and/or by adding certain frequencies to the stream. For example, an optical filter may subtract a band of frequencies from a beam of light containing multiple frequencies of light. Such filters may be used in communication networks transmitting information using beams of electromagnetic information.

A communication network transports information from a source to a destination. The source and destination may be in close proximity, such as in an office environment, or thousands of miles apart, such as in a long-distance telephone system. The information, which may be, for example, computer data, voice transmissions, or video programming, known as "traffic", usually enters and leaves a network at nodes, and is transported through the network via links and nodes. Nodes, sometimes termed offices, are devices or structures that direct traffic into, out of, and through the network. Links connect nodes and transmit data between nodes.

Modem communication networks may transmit information in digital form by light waves using links of optical fiber cable. Multiple wavelengths of light may be transmitted on one optical fiber line, each wavelength carrying a separate channel of information. One wavelength of light may carry 2.5 gigabits of information per second in one direction, and current optical fiber lines may carry 16 wavelengths at the same time. Data may be sent in two directions at the same time on one link. A network using optical fiber cable carrying multiple wavelengths is called a wavelength division multiplexed ("WDM") optical network.

The wavelength and the frequency of electromagnetic radiation are related in a fixed manner; thus electromagnetic energy and filters for electromagnetic energy may be characterized using both measures interchangeably.

Specific wavelengths carried on an optical fiber line may be added to the line or dropped (i.e., removed) from the line using an add/drop filter. Such a filter accepts as an input an optical fiber line transmitting a beam of electromagnetic energy carrying multiple frequencies, including the "target" or "tuned" frequency for which the filter is tuned (the frequency at which the filter operates, or the frequency centered in the band of frequencies at which the filter operates). The filter selects the frequency for which the filter is tuned (the "drop frequency") from the beam on the optical fiber line and provides two outputs to two optical fiber output lines. A first optical fiber output line receives the original beam from the input optical fiber line, with the tuned frequency removed, and a second optical fiber output line receives the drop frequency, separated from the original beam. The filter may accept as an input an optical fiber line carrying a frequency to be added ("add frequency"), which corresponds in frequency to the drop frequency. In such a case the first output line receives the original beam with the add frequency replacing the drop frequency. It is not necessary that the drop frequency exist in the original beam: the filter may be used to add a frequency, add a frequency and drop a frequency, or drop a frequency.

When used herein, a frequency may include a range of frequencies covering a bandwidth (a range of frequencies covering a portion of the electromagnetic spectrum). When used herein, a frequency or wavelength may refer to a beam, or a component of a beam, containing a frequency or a band of frequencies surrounding a certain frequency. A data signal or channel may be carried on a band of frequencies surrounding a certain frequency. A multiple frequency beam is a beam of electromagnetic energy containing different channels which use different frequencies.

The frequencies added and dropped from a line may carry data. Frequencies may be dropped because a node requires access to the portion of the data carried on the optical fiber beam. A frequency may be added after a node alters the information on the frequency, which was dropped, or if the frequency does not exist on the beam. A node may need to add, subtract, monitor or modify data on one or more frequencies on a beam carried on a fiber, and may need to add or drop more than one frequency. Typically, one filter is used for each frequency for which access is desired. Filters may be used to multiplex multiple frequencies of data onto one optical fiber line. Filters are used to selectively add (multiplex) or drop (demultiplex) frequencies from a fiber.

When used herein, "multiplexing" may include demultiplexing, and "multiplexer" may include a device having demultiplexing capabilities. A filter adding and/or removing a wavelength of light from a link may be termed a multiplexer, an add/drop filter, or an add/drop multiplexer ("ADM"). At each node one ADM is required for add/drop capability for each of the multiple wavelengths that may be carried on an optical fiber cable.

One known network is organized as a mesh. FIG. 1 is a block diagram illustrating a simplified portion of a mesh network. Referring to FIG. 1, mesh network 300 comprises nodes (e.g. nodes 304, 306, 308 and 310) connected by links (e.g. links 305, 307, and 309) transmitting traffic between nodes. For example, nodes 304 and 306 are connected by, and may transmit traffic via, link 305. For clarity, not all nodes and links in FIG. 1 are identified with reference numerals. Each node in network 300 may access some or all of the frequencies carried by the links to which it is connected. An add/drop filter is required at a node if traffic is to be added or dropped from a link on a certain frequency.

Typically, a node may add, drop and reroute traffic which originates or terminates at that node in order to allow customers connecting to that node access to that traffic or to route traffic to other nodes. For example, a customer connecting to node 310 may transmit traffic to a customer connecting to node 304 via links 309 and 305 and node 306, using a certain frequency. In such a case, both nodes 310 and 304 require add/drop filters tuned to that frequency. At some point the traffic on the frequency may need to be rerouted to flow to node 308 rather than 304; in such a case node 306 requires an add/drop filter to be able to access the frequency and, using equipment such as a cross connect, route the frequency to link 307 and node 308.

Networks employing architectures other than mesh configurations are also known. Ring networks, for example, interconnect nodes, using links, in a circular fashion to form rings. Multiple rings may be interconnected to form a network.

FIG. 2 is a block diagram illustrating a simplified portion of a ring network. Referring to FIG. 2, network 330 includes nodes 332, 334, 336, 338 and 340. Nodes are connected by links 331, 333, 335, 337, and 339. Nodes may use add/drop filters to add or drop a frequency from a line. For example, node 332 may send data to node 336 using a frequency of $2 \cdot 10^{14}$ Hz via links 331 and 333 and node 334. Node 336 receives a beam of light on link 333 which contains multiple frequencies, including $2 \cdot 10^{14}$ Hz, and transmits most of those frequencies unaltered on to link 335. Node 336 also receives a beam of light containing multiple frequencies on link 335 and transmits most or all of those frequencies unaltered on link 333.

To access data sent by node 332, node 336 uses an add/drop filter tuned to a target frequency of $2 \cdot 10^{14}$ Hz. The filter removes electromagnetic radiation at or near a frequency of $2 \cdot 10^{14}$ Hz (the "dropped" frequency) from link 333; all other surrounding frequencies are unaltered by the filter and node 336, and are placed on link 335. Node 336 may accept the data sent on the dropped frequency and transmit this data to, for example, customers serviced by network 300. Node 336 may add data to the frequency or alter the data on the frequency and use the filter to add this altered data stream, as a beam at frequency $2 \cdot 10^{14}$ Hz, to the beam for transmission on line 335. Frequencies other than the dropped frequency exist which may be filtered by the filter; however, such frequencies exist some distance away on the electromagnetic spectrum from the dropped frequency and are typically not included with the frequencies applied to the filter. Thus the filter accesses all frequencies surrounding the target band of frequencies; the target frequency is the frequency to which the filter is tuned.

It is sometimes desirable to reconfigure a network and reconfigure the frequencies that nodes are able to access by altering the frequencies added and dropped by filters. This may be desirable for a number of reasons. For example, in network 300, node 336, accessing a first frequency sent by node 332, may instead need to communicate with node 334 by accessing a second frequency, sent by node 334. Traffic patterns in a network may have to be rerouted due to, for example, the failure of a link or node, an increase in traffic, or the addition of equipment. This rerouting may require nodes to access different frequencies.

Optical add/drop filters typically are manufactured to operate on one frequency. Some existing optical add/drop filters have a capacity to have the frequencies on which they operate altered, and are thus considered "tunable"; however, such filters typically are not tunable over a wide variety of frequencies. Furthermore such filters may be expensive and inefficient, and may have a wider bandwidth than is desired.

FIG. 3 is a block diagram of a tunable filter. Referring to FIG. 3, tunable filter 370 alters its frequency by altering the angle at which the beam of light strikes the filter. Such a filter operates over a limited range of frequencies, is inefficient, and, as the angle of incidence increases, the amount of light energy lost to the filter increases and the bandwidth decreases. Tunable filter 370 comprises a mount 372, rotatable around an axis 373; a filter 374, adding and dropping signals at a certain frequency at a given angle of incidence; an in fiber 376, adding a signal on a single frequency; an in lens 378; a drop fiber 380, receiving a dropped signal on a single frequency; a drop lens 382; an input fiber 384, providing a multiple frequency beam as input to tunable filter 370; an input lens 386; an output fiber 390, accepting a multiple frequency optical beam altered by tunable filter 370; and an output lens 392. Lenses serve to focus the beam when the beam travels between the fiber and free space.

A beam is input to tunable filter 370 by input fiber 384 and strikes filter 374. The beam comprises multiple frequencies of electromagnetic radiation. Tunable filter 370 is designed so that, for a light beam striking filter 374 at an angle θ, a certain frequency of electromagnetic radiation (the tuned frequency) passes through filter 374 and frequencies surrounding the tuned frequency are reflected by filter 374. In such a manner one frequency, the tuned frequency, passes through filter 374 and mount 372 to be received by drop fiber 380; the signal received by drop fiber 380 is the dropped signal. Frequencies surrounding the tuned frequency output by in fiber 376 are reflected off filter 374 at angle θ and are received by output fiber 390. In fiber 376 may output a light beam at the tuned frequency; such a light beam passes through filter 374 and becomes part of the beam accepted by output fiber 390. Drop fiber 380 and output fiber 390 are moved in proportion to the change in the angle. The frequency filtered by tunable filter 370 may be altered by rotating filter 374 around axis 373 to alter θ. As θ increases, the amount of electromagnetic radiation absorbed by filter 374 increases, as does the bandwidth of filter 374. Such a decrease in the efficiency of tunable filter 370 and increase in the bandwidth of tunable filter 370 is not desirable. The range of frequencies to which the filter may be tuned is narrow. Furthermore, that fibers must be moved proportionally with the filter makes such a tunable filter difficult to implement.

FIG. 4 is a block diagram of a multiplexing/demultiplexing filter 400 for accessing multiple frequencies. Referring to FIG. 4, filter 400 includes clear holder 401, on which is mounted filters 402, 404, 406 and 408, each of which allows a band of frequencies to pass through and reflect all other frequencies; fibers 410, 412, 414, 416, 418 and 420, each either inputting a signal to or receiving a signal from multiplexing/demultiplexing filter 400, and each of which has attached one of lenses 422, 424, 426, 428, 430 and 432. Each of filters 402–408 filters a different frequency by allowing that frequency to pass through and reflecting other frequencies.

Multiplexing/demultiplexing filter 400 may act as a demultiplexer. In such a case a multiple frequency signal is input by fiber 410. At each of filters 402–408, one frequency is dropped and passes through the filter to one of fibers 412–420; the remaining frequencies are reflected to another of filters 402–408. Filter 408 reflects the last frequency to be dropped to fiber 420. Multiplexing/demultiplexing filter 400 may also act as a multiplexer. In such a case a signal on one frequency is input by each of fibers 412–420. Each of filters 402–408 allows the frequency input by its corresponding fiber to pass through the filter and to be combined with the multifrequency signal being generated; each such filter reflects all other frequencies in the multifrequency signal being generated. For example, filter 406 allows the frequency provided by fiber 416 to pass through filter 406; filter 406 reflects the frequencies provided to filter 406 by filter 408 and by fiber 418. In such a manner a multifrequency signal is generated and provided to fiber 410.

Multiplexing/demultiplexing filter 400 separates out multiple frequencies at the same time or combines multiple frequencies at the same time; such a system is expensive in that each frequency to be added or dropped requires its own fiber/lens/filter set. The expense of the equipment associated with each frequency to be added or dropped from multiplexing/demultiplexing filter 400 limits the number of frequencies which may be filtered. Furthermore, when demultiplexing, such a filter separates all frequencies on a fiber; it is often desirable only to access one of the multiple frequencies on a line. Thus, in such a system, the frequencies which are not to be removed must be recombined and placed back on the line.

Therefore, it is desirable to have a system which allows an optical filter to operate over a wide range of multiple frequencies, with a minimum of equipment costs, and a maximum of efficiency. It is desirable to have a tunable filter with a narrow bandwidth. Such a filter should be tunable easily and quickly, without the need to alter equipment or to physically assemble or disassemble equipment.

SUMMARY OF THE INVENTION

An inexpensive and efficient tunable electromagnetic filter is disclosed, having a wide range of tunable frequencies, comprising a holder with a number of filters mounted on the holder. The frequency of the filter is altered by moving the holder relative to a beam striking the holder so that one of the filters is filtering the beam. The frequency to be filtered may be easily and quickly changed, without altering the structure of the filter. In one embodiment, the tunable filter is a disk rotatable by a motor with a number of fixed frequency filters mounted around the periphery of the disk. The filter is surrounded by four fibers providing and receiving beams, as with known add-drop filters.

DETAILED DESCRIPTION

I. Overview

The present invention provides a tunable filter allowing frequencies to be added to and dropped from a beam, where the frequency to be added and dropped may be easily and quickly changed. In an exemplary embodiment of the present invention, the tunable filter is a rotatable disk with filters mounted along the edge of the disk. Each filter mounted on the disk filters a different frequency of electromagnetic radiation, and the frequency filtered by the tunable filter may be changed by rotating the disk so that a filter of the selected frequency (the "selected filter") is in the path of a beam striking the disk at an angle. The selected filter operates as does a filter in a known add-drop filter. The disk may be rotated by a motor to select a certain frequency.

In an exemplary embodiment, the tunable filter is surrounded by four fibers providing and receiving beams, as with known add-drop filters. An input fiber provides a multiple frequency beam to the selected filter at an angle; the selected filter allows the frequency which is the component of the beam to be dropped to pass through the selected filter to be received by a drop fiber. The selected filter reflects all other frequencies in the beam; these frequencies are received by an output fiber. An in fiber adds a frequency to be added by outputting a beam which, due to its frequency, passes through the selected filter and enters the output fiber.

Provision of multiple filters on one disk allows for a tunable filter which is able to maintain a narrow bandwidth and maximum efficiency while still allowing the frequency to be altered, as the angle of the beams striking the filter is not altered outside of an optimum range. That the frequency is selectable by rotating the disk provides a tunable filter with lowered equipment costs, as multiple sets of add, drop, input and output fibers are not needed. Furthermore, that the filter may be automatically rotatable, or rotatable by an external command, allows for a tunable filter whose frequency may be altered quickly and with a minimum of service interruption. The filter is tunable without the need to alter equipment or to physically assemble or disassemble equipment. That the frequencies and the frequency range of the tunable filter are defined by the multiple fixed frequency filters mounted on the holder allows the filter to operate over a wide and variable range of frequencies.

Figure 1:
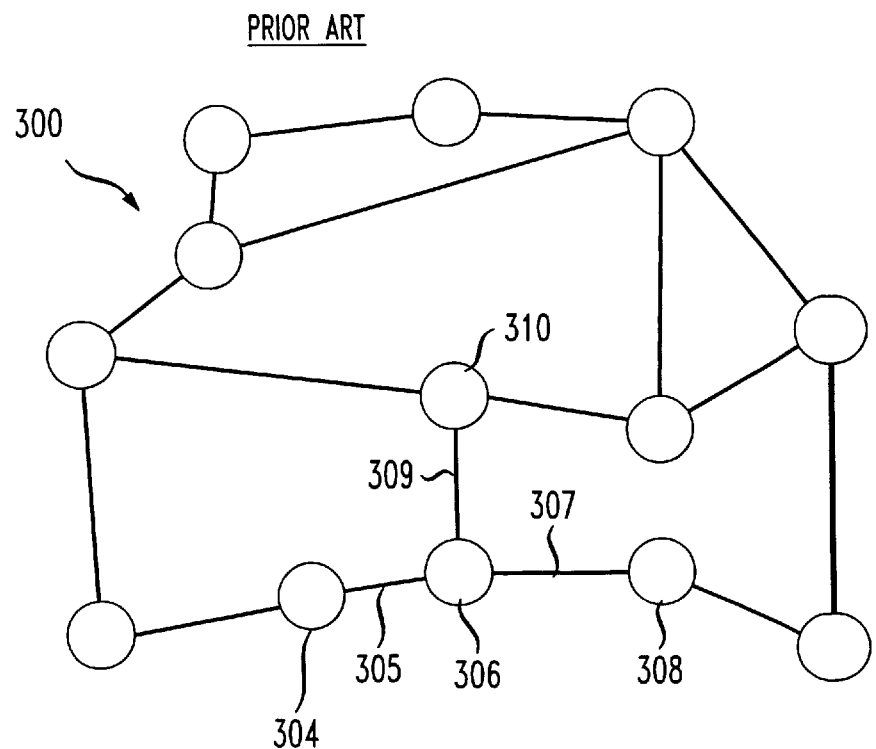
FIG. 1 is a block diagram illustrating a simplified portion of a mesh network.
Figure 2:
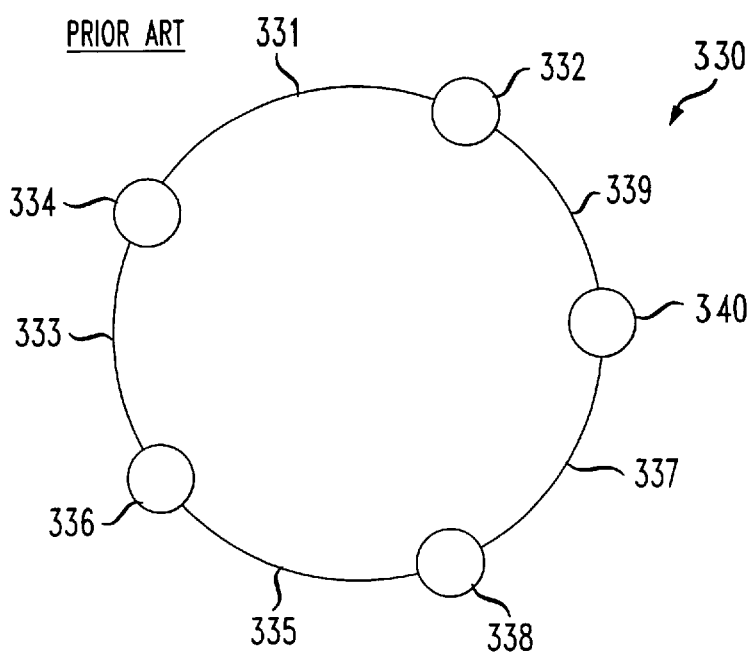
FIG. 2 is a block diagram illustrating a simplified portion of a ring network.
Figure 3:
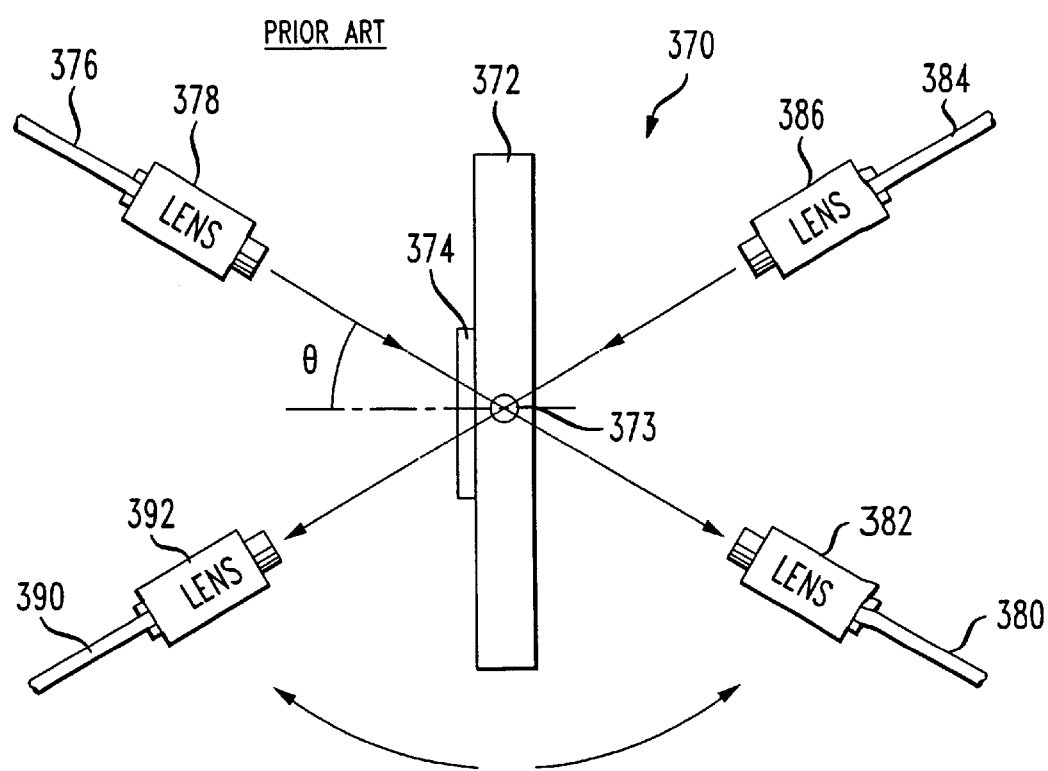
FIG. 3 is a block diagram of an a tunable filter.
Figure 4:
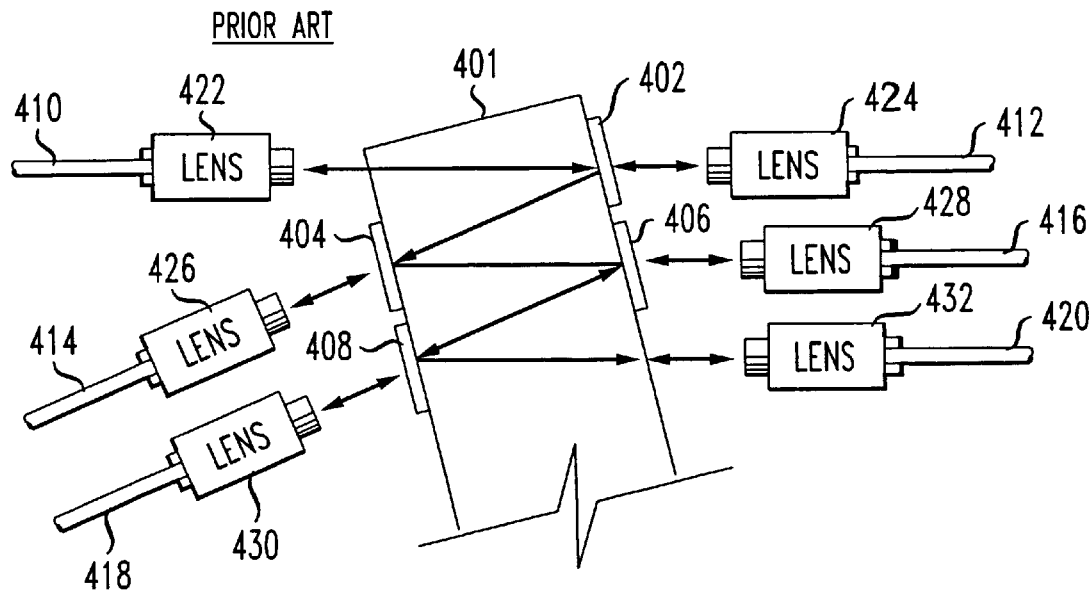
FIG. 4 is a block diagram of a filter for accessing multiple frequencies.

The tunable filter of the present invention may be used with, for example, the mesh network of the type shown in FIG. 1, the ring network of the type shown in FIG. 2, or in any other type of network. The tunable filter of the present invention may be used in non-network applications as well; for example in laboratory use requiring a tunable filter.

II. Structure

Figure 5:
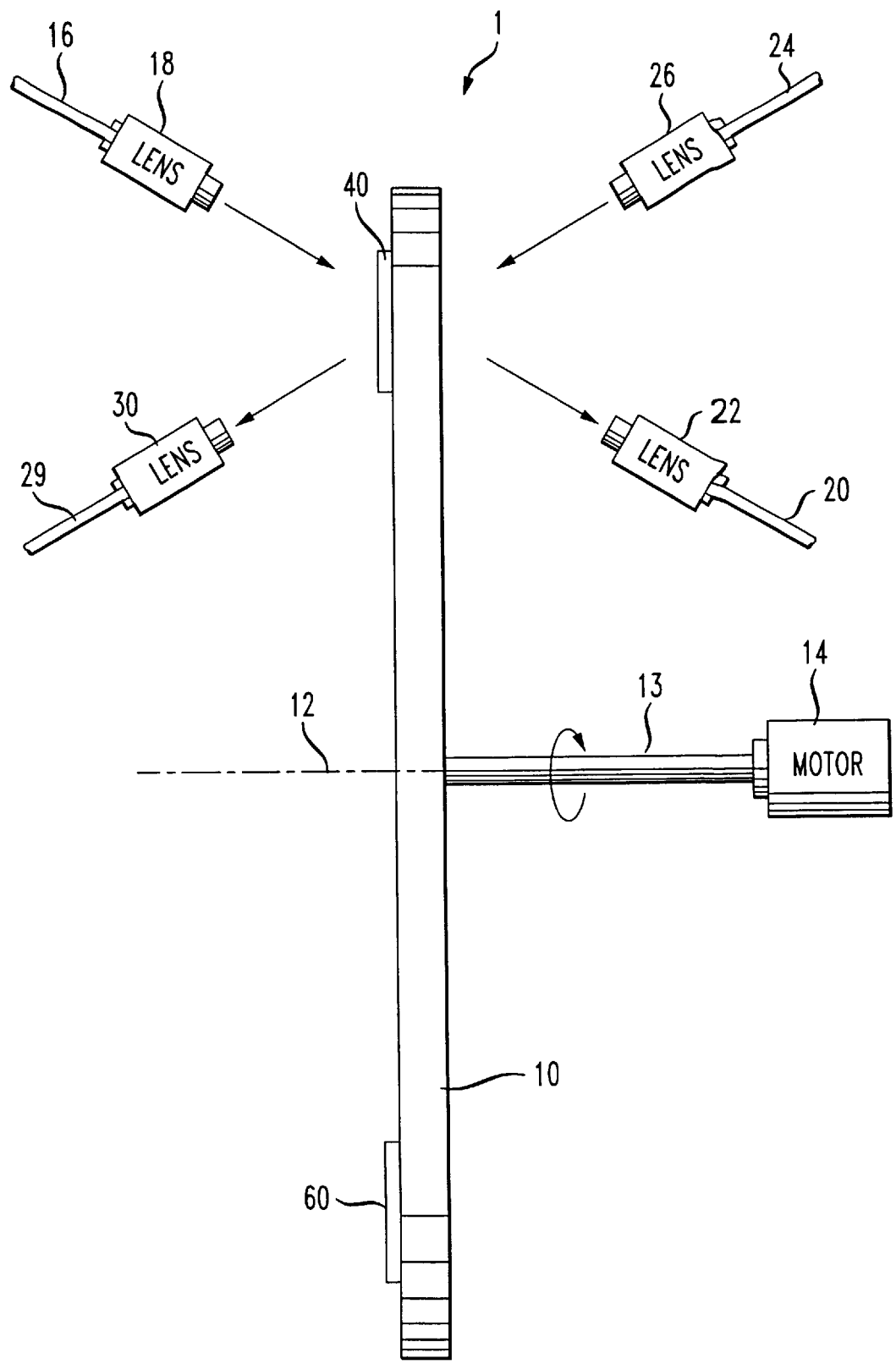
FIG. 5 is a block diagram of a tunable filter according to an embodiment of the present invention.

FIG. 5 is a block diagram of a tunable filter according to an embodiment of the present invention. Referring to FIG. 5, in an exemplary embodiment tunable filter 1 comprises a holder 10, connected to rotating member 13 and rotatable around axis 12 by a motor 14; an input fiber 16, providing a multiple frequency beam as input to tunable filter 1; an input lens 18; an in fiber 24, adding a signal on a target frequency to the multiple frequency beam; an in lens 26; a drop fiber 20, receiving a dropped signal on a target frequency; a drop lens 22; an output fiber 28, accepting a multiple frequency electromagnetic energy beam altered by tunable filter 1; and an output lens 30. Holder 10 holds (and thus is a carrier for) a plurality of electromagnetic energy filters 40, 42, 44, 46, 48, 50, 52, 54, 56, 58, 60, 62, 64, 66, 68, 70, 72, 74, 76, and 78 (for the sake of clarity, only filters 40 and 60 are shown in FIG. 5), each filter filtering electromagnetic energy at a different target frequency by allowing electromagnetic energy (including, e.g., the near infrared spectrum) at the target frequency to pass through the filter and reflecting electromagnetic energy not at the target frequency. Each filter 40–78 is mounted at the periphery of holder 10. Lenses 18, 22, 26 and 30 serve to focus the beams when the beams travel between the fibers 16, 20, 24 and 28 and free space.

Holder 10 is transparent to the frequencies input on input fiber 16 and in fiber 24 at least at the portions underneath each of filters 40–78. During operation, at any one time, one of filters 40–78 (the selected filter) is in the path of beams which may be output by fibers 16 and 24; these beams strike the selected filter at an angle $\theta$. To alter the frequency of tunable filter 1, motor 14, using rotating member 13, rotates holder 10 so that the beams output by fibers 16 and 24 strike a different one of filters 40–78 at an angle $\theta$. In an exemplary embodiment, $\theta$ is between five and 20 degrees; alternate embodiments may use different angles for $\theta$. Holder 10 may be of any transparent material, and is preferably of a low loss transparent material such as indium phosphate. In an exemplary embodiment, angle $\theta$ remains constant when the frequency of the tunable filter is altered, and thus the bandwidth and efficiency of the tunable filter remain at optimal levels.

Motor 14 may be, for example, a step motor, and may be controlled by known methods. In an exemplary embodiment, motor 14 is controlled by a microprocessor (not shown) which controls the output of a power supply (not shown) connected to motor 14. The microprocessor may act to move holder 10 in response to, for example, signals from a human operator or signals from an automatic process. Other methods of controlling motor 14 may be used.

In an alternate embodiment signals may be input to and output from tunable filter 1 in other manners; for example an in fiber or a drop fiber may not be required. Filters using a method of filtering other than allowing certain frequencies to pass and reflecting other frequencies may be mounted on the holder. In an exemplary embodiment, filters 40–78 filter electromagnetic energy of the near infrared spectrum; however, alternate embodiments may use filters filtering other components of the electromagnetic spectrum. In alternate embodiments, other methods may be used to move or rotate the holder; for example, the holder may have its position shifted rather than being rotated. Furthermore, the frequency may be altered in a manner other than moving the holder—for example, the beams may be focused on different areas of the disk. In alternate embodiments filters may be attached to the holder in different methods; for example, filters be integrated with the holder, and the holder itself may be used to filter electromagnetic energy at different wavelengths at various points on holder. Alternate embodiments may input and output beams to the filter in different manners; for example, lenses may not be required.

Each of filters 40–78 allows electromagnetic radiation of a certain frequency to pass through the filter and reflects electromagnetic radiation of other, surrounding frequencies. For each of filters 40–78 receiving a beam of electromagnetic energy at a certain angle the frequency passing through the filter is the tuned frequency or target frequency for the filter. In an exemplary embodiment, each of filters 40–78 is a narrow bandpass filter; such filters allow frequencies in a relatively narrow range to pass through.

In an exemplary embodiment, input fiber 16 directs a beam having multiple frequencies to one of filters 40–78, termed the selected filter. The beam strikes the selected filter at an angle θ. Each of the multiple frequencies which form the beam may carry information, for example in digital form; each frequency can be considered a separate channel carrying separate information. The frequency corresponding to the tuned frequency for the selected filter is allowed to pass through the selected filter to enter drop fiber 20; other surrounding frequencies are reflected off the selected filter at angle θ and enter output fiber 28. In fiber 24 may output a beam of electromagnetic energy at the tuned frequency for the selected filter; such a beam passes through the selected filter and becomes part of the beam accepted by output fiber 28.

Figure 6:
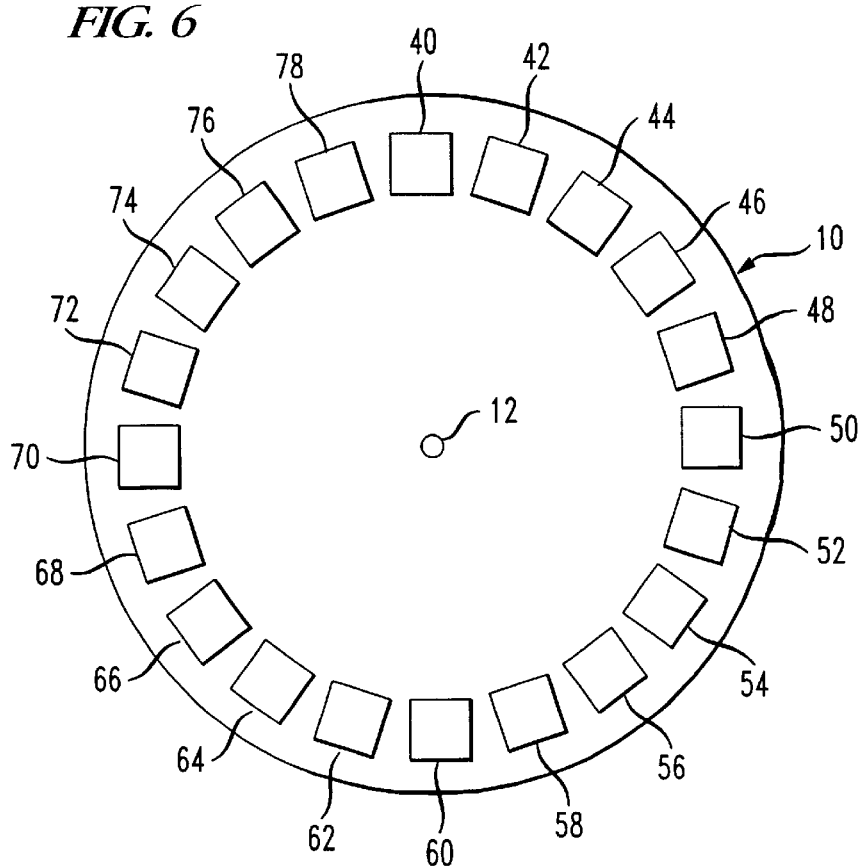
FIG. 6 is a block diagram of the holder of FIG. 5 according to an embodiment of the present invention.

FIG. 6 is a block diagram of holder 10 of FIG. 5 according to an embodiment of the present invention. Referring to FIG. 6, holder 10 is a round flat disk rotatable around axis 12, and holds a plurality of electromagnetic energy filters 40–78. In an exemplary embodiment, holder 10 is approximately 2.5 cm in diameter and holds 20 filters 40–78. Each of filters 40–78 is a flat square approximately 2 mm×2 mm. Filters 40–78 may operate in the range of wavelengths of, for example, 1485.75 to 1500 nanometers, with each filter differing in its target frequency by, for example, 0.75 nanometers. In alternate embodiments the filters mounted on the holder may operate in other wavelength ranges, the dimensions of the holder and the filters may differ (e.g., the filters may be round rather than square), and the number of filters may differ. In alternate embodiments some of the filters on the holder may operate on the same frequencies, or the frequencies of the filters may overlap to an extent. Filters 40–78 may be mounted on holder 10 by several methods. In an exemplary embodiment, the layers comprising each of filters 40–78 are deposited on holder 10 by known thin film methods. Other embodiments may use, for example, chemical bonding.

Filters 40–78 may be of a variety of known structures. For example, filters 40–78 may be thin film Fabry-Perot interferometers. Such filters are described in "Thin Film Phenomena", Kasturi L. Chopra, pp. 721–786; "Thin Film Optical Filters", H. A. Macleod, pp. 1–7, 88–184; and "Modern Optical Engineering", Warren J. Smith, pp. 167–175, incorporated herein by reference.

Figure 7:
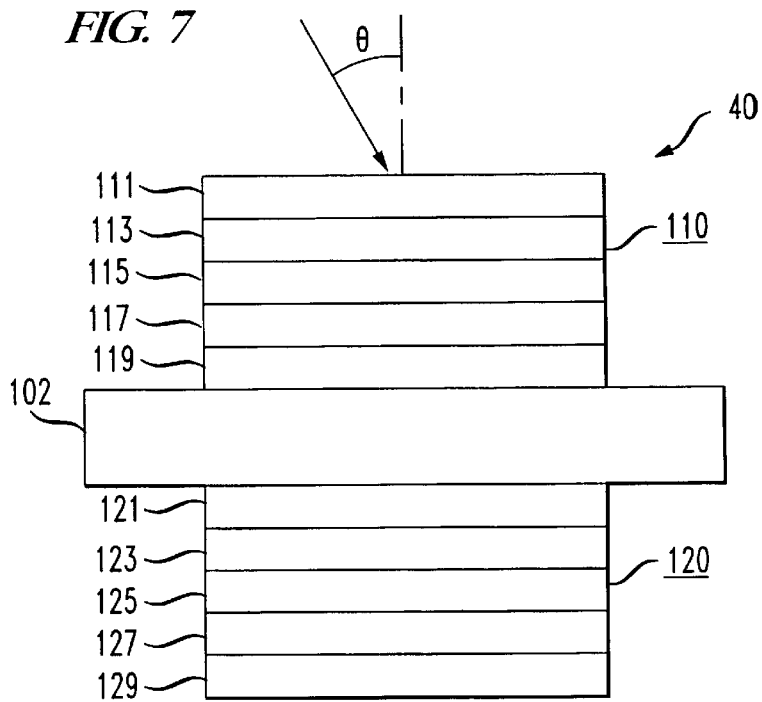
FIG. 7 is a block diagram of a filter of FIG. 5 according an embodiment of the present invention.

FIG. 7 is a block diagram of filter 40 of FIG. 5 according to an embodiment of the present invention. In an exemplary embodiment, filters 40–78 are of an identical design and function, and differ in the dimensions of the layers of the filters and thus in the target frequencies of the filters. Filter 40 separates out a narrow target band of frequencies centered at a target frequency. Referring to FIG. 7, filter 40 comprises a first mirror portion 110 and a second mirror portion 120, each allowing frequencies in the target band of frequencies to pass through while reflecting frequencies surrounding the target band of frequencies. Mirror portions 110 and 120 are reflective to electromagnetic energy of frequencies surrounding the target frequency; when used herein "reflective" may refer to a material which reflects part of the energy striking the material while allowing another part of the energy to pass through the material.

Mirrors 110 and 120 are separated by a substantially clear separator portion 102. Mirrors 110 and 120 are composed of multiple layers having alternatively high and low indexes of refraction. Each layer has a thickness $T_m$, where $T_m=\lambda/(4 \cos \theta)$, where θ is the angle of incidence of a beam striking filter 40 and λ is the desired target frequency for filter 40. Mirror portion 110 is composed of layers 111, 113, 115, 117 and 119. Mirror portion 120 is composed of layers 121, 123, 125, 127 and 129. Separator layer has a thickness $T_s$, where $T_s=\lambda/(2 \cos \theta)$, where θ is the angle of incidence of a beam striking filter 40 and λ is the desired target frequency for filter 40. Mirrors 110 and 120 may be composed of, for example, combinations of germanium, silicon monoxide, zinc sulphide, cryolite, cerium oxide, titanium dioxide, or magnesium fluoride. Other materials may be used.

The target frequency for filter 40 changes with the angle of incidence according to the formula $\lambda=2L \cdot \cos \theta$, where L is the thickness of the separator portion (with each layer in the mirror portions having a thickness of L/2), θ is the angle of incidence, and θ is the resulting target frequency. As θ increases the absorption of filter 40 increases (and thus the efficiency falls), and the bandwidth increases.

Alternate embodiments may use filters other than those described, having operations other than those described.

III. Operation

The operation of tunable filter I will be described with respect to FIG. 5. In an exemplary embodiment, motor 14 rotates holder 10 using rotating member 13 so that one of filters 40–78 is selected by being placed in the path of the beam output by input fiber 16; this filter is termed the selected filter. A beam is input to the selected filter by input fiber 16 and strikes the selected filter. The beam may comprise multiple frequencies of electromagnetic radiation.

The selected filter is designed so that for a beam striking the selected filter at an angle θ, a certain frequency of electromagnetic radiation passes through the selected filter and surrounding frequencies are reflected by the selected filter. In such a manner one frequency, the tuned frequency, passes through the selected filter and a transparent portion of holder 10 to be received by drop fiber 20; the signal received by drop fiber 20 is the dropped signal. All other surrounding frequencies output by input fiber 16 are reflected off the selected filter at angle θ (in an exemplary embodiment, between five and 20 degrees) and are received by output fiber 28. In fiber 24 may output a beam at the tuned frequency; such a beam passes through the selected filter and becomes part of the beam accepted by output fiber 28. In such a manner tunable filter 1 may filter out one component having a given frequency from a beam input along input fiber 16, may add a different component having that same frequency, and may output the resulting beam along output fiber 28.

It is not necessary that a signal is dropped or that a signal is added; in some cases a signal is dropped and no signal is added, and in other cases a signal is added and no signal is dropped. Such may be the case if, for example, no signal is provided at in fiber 24. Alternate embodiments may not provide for a signal to be added or for a signal to be dropped.

To alter the frequency filtered by tunable filter 1, motor 14 rotates holder 10 using rotating member 13 so that a new filter of filters 40–78 is in the path of the beam output by input fiber 16; this filter is termed the selected filter. The new selected filter allows a new frequency to pass through it and reflects surrounding frequencies. Thus the new selected filter may add a signal at the new frequency and may drop a signal at the new frequency.

The change in frequency occurs only as quickly as motor 14 can rotate holder 10 (in an exemplary embodiment, on the order of milliseconds) so that the new selected filter is in the proper position. Tunable filter 1 may rotate through a number of intermediate filters of filters 40–78 before the desired selected filter is reached.

It may be desirable to cease transmission of the beam through tunable filter 1 while the frequency of the tunable filter is being changed and the holder is being repositioned; a shutter mechanism (not shown), located between one or more of the input or output fibers 16, 20, 24, and 28 and the holder, may be used. Shutter mechanisms blocking beams of electromagnetic energy are known in the art.

Holder 10 may be transparent not just at the portions underneath filters 40–78 but at all portions. If so, any beam passing through holder 10 while holder 10 is rotating and not striking one of filters 40–78 passes through holder 10 and enters drop fiber 20; no signal enters output fiber 28. The rim area of holder 10, the region exposed to the beam output from input fiber 16, may be opaque in all parts not underneath one of filters 40–78. In such a case, any beam striking holder 10 while holder 10 rotates is blocked while the beam strikes portions of holder 10 not having mounted on it any filter 40–78.

Alternate embodiments of the present invention may use other shapes for the holder and other arrangements for filters mounted on the holder. For example, the holder may be rectangular and the filters may be arranged in a strip along the holder. In such an embodiment a motor moves the holder lengthwise to change the filter.

Several embodiments of the present invention are specifically illustrated and/or described herein. However, it will be appreciated that modifications and variations of the present invention are covered by the above teachings and are within the purview of the invention without departing from the spirit and intended scope of the invention.

What is claimed is:

1. A tunable add/drop filter comprising:

a carrier;

a plurality of electromagnetic energy filters mounted on the carrier, wherein each one of the electromagnetic energy filters comprises at least one reflective portion comprised of a first layer and a second layer, wherein the first layer has an index of refraction different from the index of refraction of the second layer;

wherein for each electromagnetic energy filter, when an electromagnetic energy beam strikes the filter at a given angle, the electromagnetic energy filter allows a certain portion of the frequencies in the electromagnetic energy beam striking the filter to pass through while reflecting other frequencies in the beam;

each filter in at least a subset of the plurality of electromagnetic energy filters allows a different set of frequencies to pass through it;

wherein the carrier is a disk;

each of the plurality of electromagnetic energy filters is located towards the periphery of the disk;

the frequencies filtered by the tunable add/drop filter are changed by rotating the disk;

wherein the carrier has a first side and a second side and where, at any given time, one of the plurality of the electromagnetic energy filters is a selected filter, further comprising:

a first output lens adjacent to the first side and capable of accepting a beam;

a second output lens adjacent to the second side and capable of accepting a beam;

a first input lens capable of providing an input beam to the carrier on the first side at a first angle so that a portion of the beam is reflected by the selected filter into the first output lens and a portion of the beam is transmitted by the selected filter to the second output lens; and a second input lens capable of providing an add beam to the carrier on the second side at the first angle so that at least a portion of the add beam is transmitted by the selected filter into the first output lens.

* * * * *